Dec. 27, 1927.
R. W. WEIR
1,653,938
CLUTCH
Filed June 15, 1923
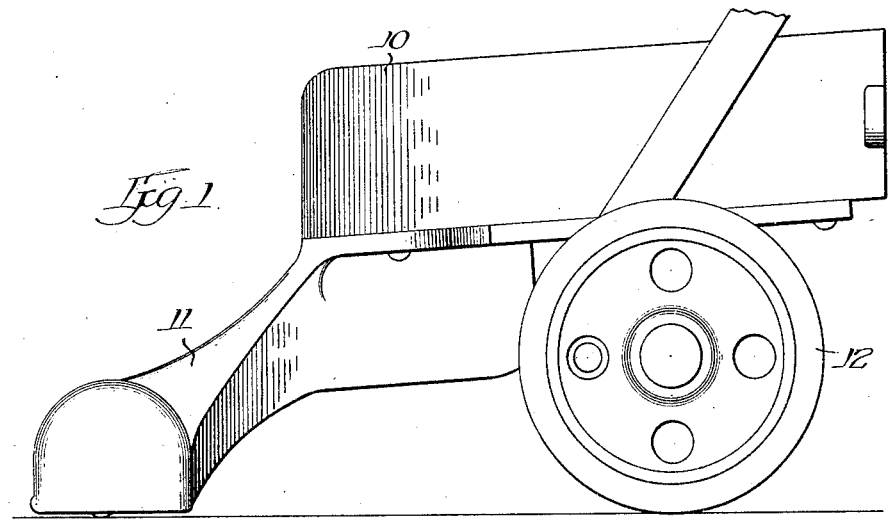
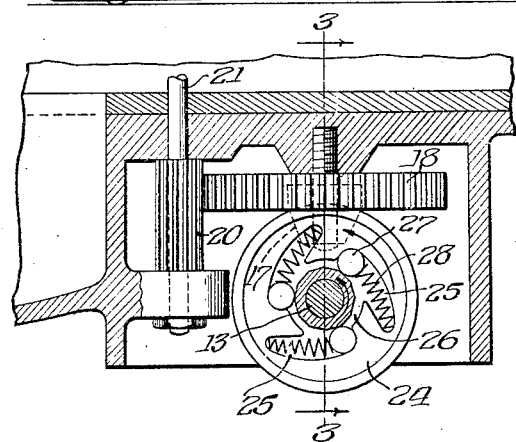
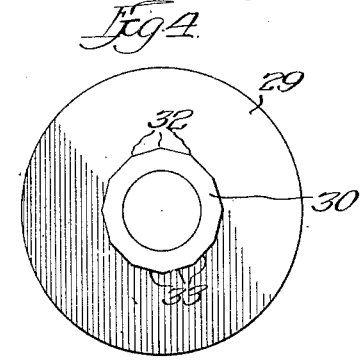
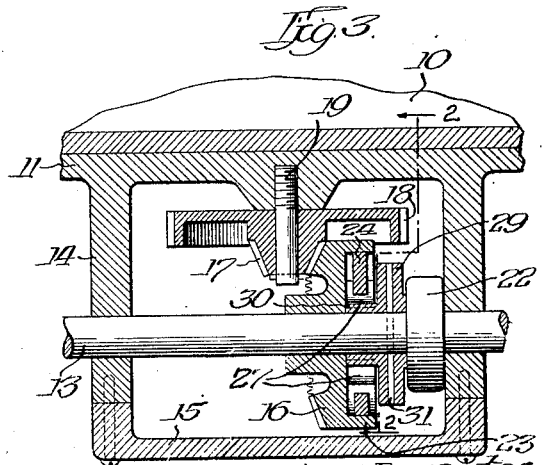

Patented Dec. 27, 1927.

1,653,938

UNITED STATES PATENT OFFICE.

ROY W. WEIR, OF HAMMOND, INDIANA, ASSIGNOR, BY MESNE ASSIGNMENTS, TO THE MARVEL COMPANY, OF HAMMOND, INDIANA, A CORPORATION OF INDIANA.

CLUTCH.

Application filed June 15, 1923. Serial No. 645,503.

The present invention is related to clutching devices for establishing and breaking the driving relation between driving and driven elements. While of general application its primary utility is directed to suction cleaners of the non-electric type.

In suction cleaners of the character referred to the suction fan usually is actuated by the axle of the traction wheels of the machine. On the forward movement of the machine a clutch included in the gear connections between the axle and the fan operates to transmit motion from such axle to the fan. When movement of the machine is reversed this driving relation is interrupted, and the clutch permits the fan to continue operating under the momentum induced by the forward movement of the machine.

Roller ratchet clutches usually are employed in the above-described cleaners. As ordinarily constructed, the clutches are sluggish in action, and do not respond as speedily as is desirable, either when establishing the driving connection between the driving and driven elements, or when breaking such connection. Furthermore, the surfaces with which the ratchet rollers co-operate are of extended area so that the action of the same on the ratchet rollers is not sufficiently positive to afford the requisite binding connection therewith when the driving relation is established, nor to release these rollers when the driving relation is broken.

The present invention aims to provide a clutch which will overcome the objectionable characteristics mentioned, and by which the driving relation between the driving and driven elements may be established and broken with the greatest expedition, as well as in the most positive and effective manner, thus permitting the cleaner to be operated with greater ease and freedom of movement, and without imposing on the operation of the fan the dragging action incidental to the sluggish release of the clutch.

Other objects and advantages of the invention will be apparent as the nature of the improvements is better understood, the invention consisting substantially in the novel construction, combination and arrangement of parts hereinafter fully described, illustrated in the accompanying drawings, and finally pointed out in the appended claims.

The form of the invention herein delineated marks a preferred embodiment thereof and exemplifies a practical adaptation of the invention, but the latter is susceptible of variation in such application. The present disclosure, therefore, is to be considered from an illustrative standpoint and without imposing restriction or limitation on such embodiment of the invention as may be required to meet the practical conditions under which the invention is utilized.

In the drawings,

Fig. 1 is a side elevation of a suction cleaner of the non-electric type with which the present invention is associated;

Fig. 2 is a vertical sectional view through the gear housing thereof and illustrating in elevation the clutch of the invention;

Fig. 3 is a similar view on the line 3—3, Fig. 2; and

Fig. 4 is an enlarged detail elevation of the driving element of the clutch.

Referring in detail to the accompanying drawings, the numeral 10 designates the fan casing of a suction cleaner of the non-electric type. Associated with this casing is a suction nozzle 11 through which the dust-laden air is drawn into the casing 10. The casing 10 is supported by traction wheels 12, one only of which is seen, and said wheels are mounted on an axle 13 and fixed thereto in such manner that on the rotation of the wheels 12 the axle 13 also will be rotated.

At the under side of the top of the suction nozzle 11 is a depending gear housing 14, and through said housing the axle 13 extends, as clearly illustrated in Fig. 3. This housing 14 is closed at its under side by a detachable bottom 15. Loosely mounted on the axle 13 within the housing 14 is a bevel gear 16, said gear meshing with a bevel pinion 17 forming part of a spur gear 18 rotatably mounted on a stub shaft 19. The gear 18 also meshes with a spur pinion 20 carried by a fan shaft 21, and to said shaft 21 a fan, disposed within the casing 10, is connected. A spacing collar 22 is fitted to the axle 13 and arranged in a portion of the space between the bevel pinion 16 and one of the sides of the housing 14 in order to maintain the bevel pinion 16 in mesh with the pinion 17 through the intermediary of a hereinafter described driving element 29 on the axle.

The parts above described are found in one of the types of non-electric suction cleaners commercially designated as "The Marvel" cleaner, and now generally found on the market. It is with this particular type of cleaner that the present invention more especially has to do. In this particular cleaner provision is made so that on the forward movement of the machine the fan within the casing 10 is positively rotated, while on the reverse movement of the machine, or when it is drawn backwardly by the operator, the driving connection between the axle 13 and the fan is interrupted, the fan continuing to rotate under the momentum which it receives on the forward movement of the machine. To this end there is associated with the bevel gear 16 the driven element 23 of the clutch which is employed for establishing and breaking the driving connection referred to. This includes a peripheral flange extending laterally of the gear 16 and within which is fixedly positioned a washer 24 in which is formed a plurality of tapering tangential slots 25 which radiate from a central opening 26 and have greater radial dimensions just back from their ends than at their ends. These slots, therefore, occupy an eccentric relation to the opening 26. Within each of the slots 25 is located a ratchet roller 27 against which presses one end of a coil spring 28, the other end of the coil spring being seated against the outermost end of the slot 25. Each of the springs thus normally urges its ratchet roller towards the enlarged end of the slot 25 occupied thereby and yieldingly holds the same in such end.

Associated with the driven element 23 is a driving element 29. This is constituted by a circular disk which is perforated to receive the axle 13, said disk having at one of its sides a laterally extending hub 30. The disk 29 is rigidly held with respect to the axle 13 by a pin 31 which passes through the disk and the axle, and the disk thus is caused to rotate with the axle 13 as the axle is operated by the traction wheels. The hub 30 lies within the opening 26 of the driven member of the clutch, and its peripheral surface is provided with a plurality of engaging ridges 32 formed at the points of joinder of a series of narrow tangential plane surfaces 33 which constitute the peripheral face of the hub 30. These surfaces are of relatively small area so as to afford a multiplicity of the ridges 32, and said ridges are designed to contact with the several roller ratchets 27 and bite into the same in order to wedge the ratchets into the inner ends of the slots 25 to establish the locking relation of the driven element 23 to the driving element 29. Because of the fact that there is a multiplicity of these engaging ridges, the binding action of the same against the roller ratchets 27 is most expeditious, in fact instantaneous, and as soon as the machine is pushed forwardly the driving member 29 immediately becomes locked into engagement with the driven element 23 of the clutch. When the machine is moved forwardly, the driving member 29 will rotate in the direction indicated by the curved arrow thereon, and when the machine is moved rearwardly, the member 29 will rotate in the opposite direction. When the member 29 is rotating in the direction of the arrow, the driven element 24 will be caused to rotate in that direction also as indicated by the curved arrow thereon, due to engagement of the ridges 32 on the driving element with the rollers 27 pocketed in the inner ends of the slots 25, but when the member 29 commences to rotate in the opposite direction, the ridges 32 will move the rollers 27 tangentially of the driving element away from the inner ends of the slots 25, thus instantaneously breaking the connection between the driving and driven elements, and the driven element will be free to continue to rotate in the direction of the arrow thereon.

The provision of the multiplicity of engaging ridges 32 enables the clutch to operate with the highest degree of speed, both in establishing the driving relation and breaking such relation between the driving and driven elements, and the clutch is thereby relieved of sluggish action in establishing the driving relation and breaking the same between the axle 13 and the suction fan within the casing 10.

I claim:

1. In a clutch, the combination with a driven element, of a driving element associated therewith, and ratchet rollers interposed between the driving element and the driven element, one of the latter elements being provided with a series of transverse ridges which bite into the rollers, and the other being provided with pockets which are so arranged relative to the ridges as to preclude any substantial movement of the rollers in a direction radially of the clutch and are shaped to bear at their front portions against the front and outer surfaces of the rollers to hold the same abruptly against movement when bitten into by the ridges, whereby to connect the driven and driving elements in any position with a rigid but readily releasable interlock.

2. In a clutch, the combination with concentrically arranged outer driven and inner driving elements, of ratchet rollers interposed therebetween, and springs tending to move the rollers in one direction tangentially of the axis of the elements, the driving element being provided with a series of transverse outwardly projecting ridges which bite into the rollers throughout the lengths thereof, and the driven element being provided with inwardly opening pockets which are curved approximately 90° at their front portions to conform with the front and outer surfaces of the rollers to hold the same abruptly against movement when bitten into by the ridges, whereby to connect the driven and driving elements in any position with a rigid but readily releasable interlock.

3. In a clutch, the combination with a driven element, of a driving element associated therewith, and circumferentially spring pressed locking elements interposed between the driving element and the driven element, the driving element being provided with a series of closely-spaced transversely-extending engaging ridges which bite into the locking elements to bind the latter into engagement with the driven element.

4. In a clutch, the combination with a driven element, of a driving element associated therewith, and locking elements interposed between the driving element and the driven element, the driving element being provided with a plurality of plane surfaces and a series of engaging ridges at the points of joinder of said surfaces, said engaging ridges biting into the locking elements to bind the latter into engagement with the driven element.

5. In a clutch, the combination with a driven element, of a driving element associated therewith, said driving element being provided with a laterally extending hub, and locking elements interposed between said hub and the driven element, the hub of the driving element having a plurality of plane surfaces and a series of engaging ridges at the points of joinder of said surfaces, said engaging ridges biting into the locking elements to bind the latter into engagement with the driven element.

6. In a clutch, the combination with a driven element, of a driving element associated therewith, said driving element being provided with a laterally extending hub, the driven element also being provided with a series of eccentrically-arranged slots, and ratchet rollers arranged in said slots in proximity to the laterally extending hub of the driving element, said hub being provided with a plurality of plane surfaces about its periphery and a series of engaging ridges at the points of joinder of said surfaces, said engaging ridges biting into the ratchet rollers to bind the latter into engagement with the driven element.

In testimony whereof I have hereunto set my hand.

ROY W. WEIR.